United States Patent
Murdoch

[15] 3,688,569
[45] Sept. 5, 1972

[54] ULTRASONIC SURFACE ROUGHNESS INDICATOR

[72] Inventor: Andrew M. Murdoch, Bethel, Conn.
[73] Assignee: Automation Industries, Inc., Los Angeles, Calif.
[22] Filed: July 16, 1970
[21] Appl. No.: 55,444

[52] U.S. Cl....................................73/105, 73/67.5 R
[51] Int. Cl................................................G01b 5/28
[58] Field of Search.....73/105, 67.5, 67.7, 67.8, 67.9

[56] References Cited

UNITED STATES PATENTS

| | | | |
|---|---|---|---|
| 3,482,435 | 12/1969 | Gunkel...................... | 73/67.9 |
| 3,433,058 | 3/1969 | Tobin et al............... | 73/105 X |
| 3,122,720 | 2/1964 | Morse...................... | 73/67.7 X |
| 3,379,051 | 4/1968 | Zeutschel et al. .......... | 73/67.9 |

OTHER PUBLICATIONS

" Critical Ultrasonic Reflectivity," Materials Evaluation, Dec. 1966, pp. 683–689.
Paper 700144, Society of Automotive Engineers, " Surface Finish Testing," Jan. 12–16, 1970.

Primary Examiner—Richard C. Queisser
Assistant Examiner—Arthur E. Korkosz
Attorney—Dan R. Sadler

[57] ABSTRACT

There is disclosed herein a test system for measuring the surface roughness of a workpiece by transmitting a beam of ultrasonic energy onto the surface at an oblique angle. Smooth surfaces reflect the beam with a minimum effect upon the shape of the beam whereas rough surfaces reflect the beam so as to cause it to be scattered. The detected reflected energy varies as a function of surface roughness.

6 Claims, 7 Drawing Figures

Andrew M. Murdoch,
INVENTOR.
BY.
ATTORNEY.

Andrew M. Murdoch,
INVENTOR.
BY.
R Sadler
ATTORNEY.

ULTRASONIC SURFACE ROUGHNESS INDICATOR

BACKGROUND

This invention relates to nondestructive test systems, and more particularly to ultrasonic test systems capable of measuring the surface roughness of a workpiece.

One of the simplest known techniques for determining the surface roughness of a workpiece is by visual or tactile inspection. However, this type of inspection does not generate quantitative results since analysis depends on the subjective opinion of each individual tester. In addition, it is of little value where the surface is relatively smooth or inaccessible as, for example, on the inside of a workpiece.

In another form of inspection a mechanical stylus travels across the surface of the workpiece to be tested. The variations in the surface mechanically vibrate the stylus. The mechanical vibrations of the stylus are converted into electrical signals by a suitable transducer in much the same manner as in the phonograph record reproducing art. Although this type of inspection is capable of providing quantitative results it tends to mark the surface of the workpiece. Moreover this approach is not suitable where maintenance of surface integrity is required or the surface is not physically accessible to the stylus.

SUMMARY

According to the present invention, there is provided a surface roughness tester which is capable of quantitatively measuring the surface characteristics of both physically accessible and inaccessible surfaces, while, at the same time maintaining surface integrity.

Briefly described the invention provides an instrument for transmitting a beam of ultrasonic energy onto the surface and receiving the energy reflected therefrom. If the surface is smooth the reflected ultrasonic energy will remain in a well-defined beam. In contrast if the surface is rough at least a portion of the energy is reflected throughout a wide area. The transmitting transducer or a second receiving transducer is effective to receive the reflected energy and generate a corresponding electrical signal. By determining the magnitude of the electrical signal and/or variations therein it is possible to determine the smoothness of the surface and/or variations in the smoothness.

DESCRIPTION OF THE DRAWINGS

These and other features and advantages of the present invention will be apparent to those skilled in the art when taken into consideration with the following detailed description, wherein like like reference numerals indicate like and corresponding parts throughout the several views and wherein.

DETAILED DESCRIPTION OF THE DRAWINGS

Figure 1:
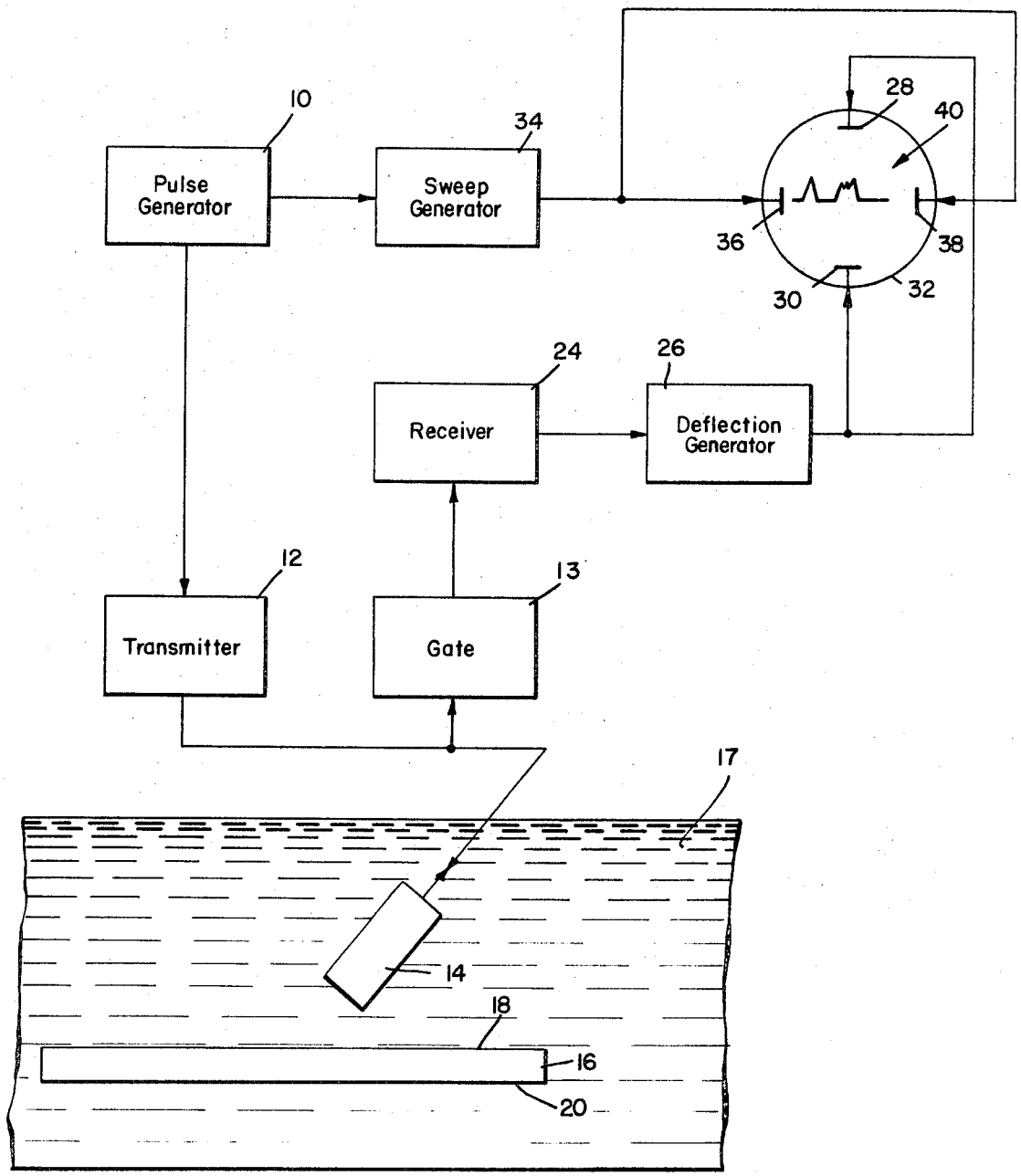
FIG. 1 — is a block diagram of an ultrasonic test system incorporating the principles of this invention.

An ultrasonic test instrument of the type referred to herein is shown in FIG. 1. A pulse generator 10 provides a plurality of groups of high frequency pulses to a transmitter 12. The pulse generator 10 normally determines pulse repetition rate of signals from the transmitter 12. The transmitted signals are applied to a gate 13 and to a search unit 14, as illustrated. The search unit 14 may preferably be of the type which includes a piezoelectric transducer which vibrates in a thickness mode when electrical signals from the transmitter 12 are applied thereto. Search unit 14 converts the electrical signals into acoustical impulses which, after transmission via a suitable couplant 17, impinge upon a workpiece 16.

The acoustic impulses propagate through the couplant 17 and the workpiece 16 until they strike a reflecting boundary such as the surfaces 18 or 20 of the workpiece. Although the couplant 17 is shown as a liquid it may be a liquid or a solid. Alternatively, it may even be a gas such as air if the frequency, etc., are all properly selected. At the workpiece surfaces 18 or 20, portions of the impinging beam are reflected back, away from the boundaries. If the surfaces 18 and 20 are smooth, all the reflected energy is directed away from the search unit 14. However, if the surfaces exhibit some roughness, a portion of the reflected energy will be directed back toward the search unit 14. The search unit 14 generates an electrical voltage corresponding to the received ultrasonic energy. Both the initial electrical impulses and the reflected pulses are received by the gate 13 which allows for differentiation between top and rear surface reflection signals as will hereinafter more fully be described.

The signals from the gate 13 are applied to a receiver 24. The signals from the receive 24 are then applied to a deflection generator 26, which in turn applies the signals to the vertical deflection plates 28 and 30 of a cathode ray tube 32.

The horizontal time base for the cathode ray tube 32 is provided by a horizontal sweep generator 34, which is also initiated by the pulse generator 10 upon generation of the initial impulses. The sweep signal is applied to the horizontal deflection plates 36 and 38 of the cathode ray tube 32. The cathode ray tube therefore shows vertical deflections on a horizontal base on the display 40 in a manner well known to the art.

Figure 2:
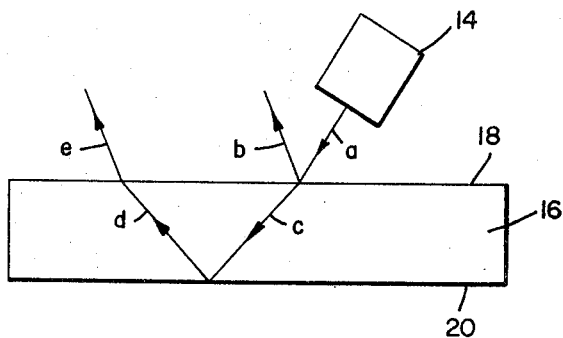
FIG. 2 — is a diagram illustrating ultrasonic beam reflection from idealized smooth upper and lower workpiece surfaces.

Referring now to FIG. 2, a beam diagram illustrating ultrasonic beam reflections from idealized smooth upper and lower surfaces is shown. Beam $a$, after impinging upon the workpiece surface 18, divides into a least two beam components, $b$ and $c$. Beam component $b$ constitutes that portion of beam $a$ which is reflected from the surface 18. Since the surface 18 is an idealized smooth surface, the angle of incidence of beam $a$ equals the angle of reflection and beam component $b$ is reflected away from the search unit 14. Beam portion $c$ constitutes that portion of the beam $a$ which is refracted and transmitted through workpiece 16, eventually striking the lower workpiece surface 20. Beam $d$ comprises that portion of beam $c$ which is reflected from lower surface 20. Since surface 20 is also an idealized smooth surface, beam $d$ also travels in a direction away from search unit 14. As is apparent from FIG. 2, smooth surfaces will not reflect any energy back toward the search unit 14. An absence of detectible reflected energy, therefor, is an indication that the workpiece surfaces are relatively smooth.

Figure 3:
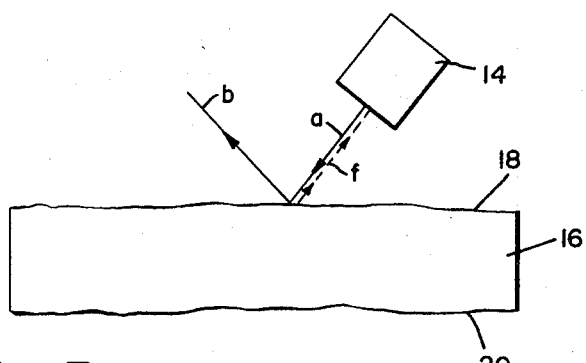
FIG. 3 — is a diagram illustrating ultrasonic beam reflection from a nonsmooth upper workpiece surface.

Referring now to FIG. 3, a beam diagram illustrating ultrasonic beam reflections from a nonsmooth upper workpiece surface is shown. The nonsmooth upper surface 18 causes a fan-like redirection of the incident energy beam. In addition to reflection component $b$, at least a portion of the incident energy is reflected in the direction of beam component $f$. Beam $f$, as may be seen in FIG. 3, is directed back toward the search unit 14 where it may readily be detected and measured.

Figure 4:
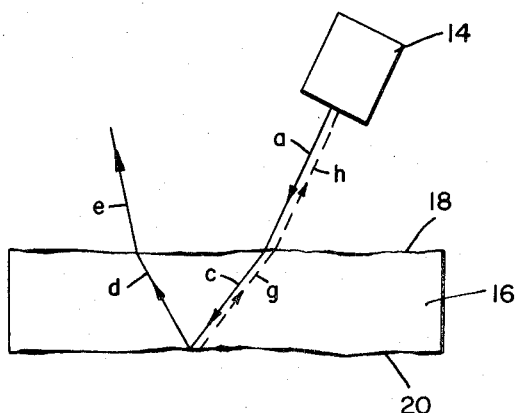
FIG. 4 — is a diagram illustrating ultrasonic beam reflection from a nonsmooth lower workpiece surface.

Referring now to FIG. 4, a beam diagram illustrating ultrasonic beam reflections from a nonsmooth lower workpiece surface 20 is shown. As may be seen in FIG. 4, nonsmooth lower surface 20 causes a fan-like redirection of the incident energy beam $c$. In addition to reflection component $d$, at least a portion of the incident energy is reflected in the direction of beam $g$ which, upon emerging from workpiece 16, as beam $h$, intersects the search unit 14 where it may be detected and measured.

It is obvious from an analysis of FIGS. 3 and 4 that beam component $f$ will arrive at search unit 14 some predetermined time before beam component $h$. The time differential will, of course, depend upon the transmission speeds of the coupling medium and the workpiece, the distance from the workpiece to the search unit, and the thickness of the workpiece. Gate 13, FIG. 1, may therefore be set in a well-known manner to pass either only the upper surface reflection signals, the lower surface reflections signals, or both. It should be noted that the configuration of the workpiece 16 is not limited. Flat slabs may, of course, be inspected in accordance with the teachings of the instant invention. However, other workpiece configurations may also be inspected with equal ease. For example, tubular configurations wherein the inner surfaces thereof are not otherwise accessible may be readily inspected by the disclosed apparatus.

Figure 5A:
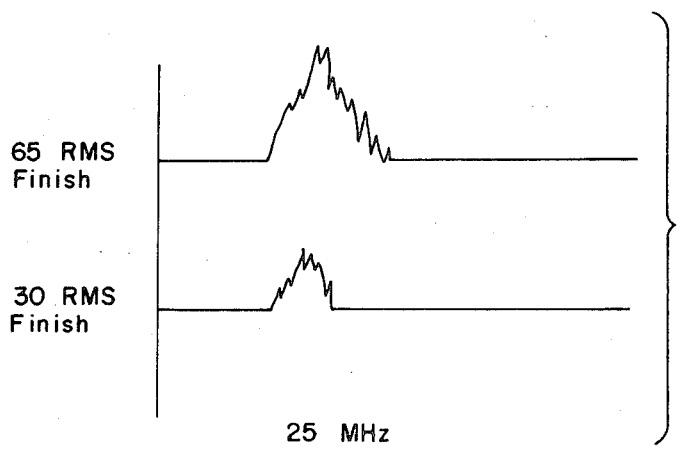
FIGS. 5a and 5b — are graphs illustrating typical reflection signals.
Figure 5B:
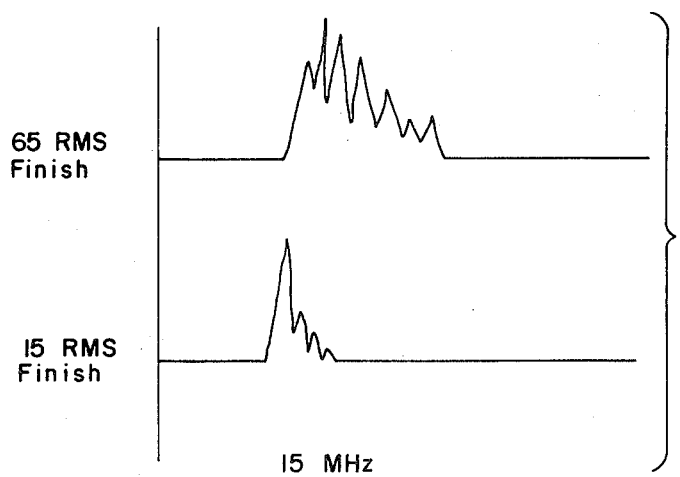

Referring now to FIGS. 5a and 5b, typical waveforms which may be viewed on Display 40 of FIG. 1, or other suitable recording or display mediums, are illustrated. FIG. 5a depicts illustrative waveforms produced when 65 rms finish and 30 rms finish surfaces, respectively, were tested with an ultrasonic beam of 25 MHz. As can be seen, the waveforms at 25 MHz show a direct correlation of both signal amplitude and signal decay with rms finish. FIG. 5b depicts illustrative waveforms produced when 65 rms finish and 15 rms finish surface were tested at 15 MHz. As can be seen, the waveforms at 15 MHz show a useful correlation of signal decay with rms finish.

Figure 6:
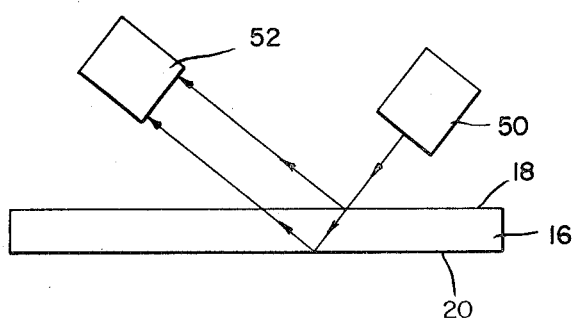
FIG. 6 — is a diagram showing reflectivity measured as a function of smoothness.

Referring now to FIG. 6, there is shown yet a further embodiment of this invention whereby reflectivity is measured as a function of smoothness. A pair of search units 50 and 52 are shown obliquely angled towards the workpiece 16. In this manner ultrasonic energy is reflected from surface 18 and/or 20 towards a receiving transducer 52. More energy is received and measured by transducer 52 from smooth surfaces because of total reflectivity. If surfaces 18 or 20 are rough less ultrasonic energy reflections are received by transducer 52. Thus any measurements observed on the cathode ray tube 32 would be less for rough surfaces and more for smooth surfaces.

The apparatus above described is capable of accurately providing quantitative surface roughness information relating to both physically accessible and inaccessible surfaces with a maximum of simplicity and testing ease.

What is claimed is:

1. A test system for measuring the surface roughness of a workpiece, comprising
    means for directing ultrasonic energy onto a predetermined portion of the surface of the workpiece at a fixed angle whereby the amount of energy reflected from said portion is a function of the roughness thereof,
    said means being adapted to receive at least a portion of the ultrasonic energy reflected from said portion of said surface and to generate a signal having a magnitude corresponding to the amount of ultrasonic energy reflected from said portion of said surface to said means, and
    means responsive to the magnitude of said signal for indicating the roughness of said portion of the surface of the workpiece.

2. An ultrasonic test system for determining the roughness of the surface of a workpiece including the combination of
    means for transmitting and receiving ultrasonic energy,
    said means being effective to transmit ultrasonic energy onto a predetermined portion of a surface of the workpiece at a fixed oblique angle whereby the amount of ultrasonic energy reflected from said portion in a predetermined direction is a function of the roughness of said portion,
    said means being effective to receive the energy reflected from said portion in said direction an to produce a signal having a magnitude which is a function of the received energy, and
    detecting means coupled to said first means and responsive to the magnitude of said signal to indicate the roughness of said portion of said surface.

3. The system of claim 2 wherein the workpiece has a second surface opposite the first surface,
    said first means is effective to transmit a portion of the ultrasonic energy through the workpiece to reflect from the second surface and produce a second signal corresponding to the surface roughness of the second surface,
    said detecting means being responsive to said second signal to indicate the roughness of the second surface.

4. The system of claim 3 wherein
    said first means transmits said ultrasonic energy in a series of pulses of predetermined duration,
    gate means in said detecting means for selectively gating the first and second signals to said measuring means.

5. A test system for measuring the surface roughness of a workpiece including the combination of
    transmitter means adapted to produce a series of pulses, transducer means coupled to said transmitter and responsive to said pulses, said transducer means being effective to transmit pulses of ultrasonic energy onto a preselected portion of said surface at a fixed oblique angle, said transducer means being effective to receive echoes of said pulses of ultrasonic energy reflected from said portion and to produce an electrical signal corresponding thereto, and a receiver coupled to said transducer means to receive the electrical signals generated by said transducer means, said receiver being effective to indicate the surface roughness of the workpiece.

6. The test system of claim 5 including a gate in said receiver effective to OPEN during said received signal.

* * * * *